US009187602B2

(12) United States Patent
Katsoulis et al.

(10) Patent No.: US 9,187,602 B2
(45) Date of Patent: Nov. 17, 2015

(54) HETEROELEMENT SILOXANE COMPOUNDS AND POLYMERS

(75) Inventors: Dimitris Elias Katsoulis, Midland, MI (US); Mark Jon Loboda, Bay City, MI (US); Elizabeth McQuiston, Midland, MI (US); Luisel Rodriguez, Champaign, IL (US)

(73) Assignee: Dow Corning Corporation, Midland, MI (US)

( * ) Notice: Subject to any disclaimer, the term of this patent is extended or adjusted under 35 U.S.C. 154(b) by 504 days.

(21) Appl. No.: 12/526,521

(22) PCT Filed: Feb. 4, 2008

(86) PCT No.: PCT/US2008/052875
§ 371 (c)(1),
(2), (4) Date: Sep. 3, 2009

(87) PCT Pub. No.: WO2008/097877
PCT Pub. Date: Aug. 14, 2008

(65) Prior Publication Data
US 2010/0041851 A1  Feb. 18, 2010

Related U.S. Application Data

(60) Provisional application No. 60/888,784, filed on Feb. 8, 2007.

(51) Int. Cl.
| | |
|---|---|
| C08G 77/04 | (2006.01) |
| C08G 77/58 | (2006.01) |
| C08L 83/14 | (2006.01) |
| C08G 77/12 | (2006.01) |
| C08G 79/00 | (2006.01) |
| C08G 79/12 | (2006.01) |
| C08L 85/00 | (2006.01) |

(52) U.S. Cl.
CPC ............. *C08G 77/58* (2013.01); *C08L 83/14* (2013.01); *C08G 77/12* (2013.01); *C08G 79/00* (2013.01); *C08G 79/12* (2013.01); *C08L 85/00* (2013.01)

(58) Field of Classification Search
CPC ........ C08G 77/12; C08G 77/58; C08G 79/00; C08G 79/12; C08L 85/00; C08L 83/14
See application file for complete search history.

(56) References Cited

U.S. PATENT DOCUMENTS

| | | | |
|---|---|---|---|
| 3,419,593 A | | 12/1968 | Willing |
| 3,510,502 A | * | 5/1970 | Moedritzer ............ 556/10 |
| 3,912,831 A | * | 10/1975 | Kan et al. ............ 503/217 |
| 4,361,691 A | * | 11/1982 | Yajima et al. ............ 528/28 |
| 4,455,414 A | * | 6/1984 | Yajima et al. ............ 528/30 |
| 4,919,843 A | * | 4/1990 | Innertsberger et al. ....... 516/117 |
| 5,100,762 A | * | 3/1992 | Tanaka et al. ............ 430/270.1 |
| 5,614,654 A | * | 3/1997 | Miyake et al. ............ 556/10 |
| 5,972,516 A | | 10/1999 | Kaneko et al. |
| 6,319,551 B1 | | 11/2001 | Risen, Jr. et al. |
| 6,531,229 B1 | * | 3/2003 | Franzoni et al. ............ 428/447 |
| 7,057,002 B2 | | 6/2006 | Lee et al. |

FOREIGN PATENT DOCUMENTS

| | | |
|---|---|---|
| EP | 1498443 | 1/2005 |
| JP | 3-259924 | 11/1991 |
| JP | 5066301 | 3/1993 |
| JP | 5-88036 | 4/1993 |
| JP | 2003-147083 | 5/2003 |
| JP | 2003-172802 | 6/2003 |
| WO | WO 93/02088 | 2/1993 |
| WO | WO 97/22653 | 6/1997 |

OTHER PUBLICATIONS

Written Opinion of the International Searching Authority Application No. PCT/US2008/052875, dated Feb. 20, 2009, 5 pages.
International Search Report Application No. PCT/US2008/052875, dated Feb. 20, 2009, 5 pages.
Rochow, E. G. "Dimethylgermanium Sulfide and Dimethylgermanium Oxide." Journal of the American Chemical Society. vol. 70, No. 5, May 1948, pp. 1801-1802 (2 pages).
Brown, M. P. et al. "Dimethylgermanium Oxide and Dimethylgermanium Sulfide." Jounrla of American Chemical Society. vol. 82, No. 16, pp. 4166, 4168 (2 pages).
Brown, M. P. et al. "Infrared Spectra of Some Methyl Derivatives of Germanium and Tin." Spectrochimica Acta. vol. 16, No. 5, Jun. 1960, pp. 595-601 (7 pages).
Barrau, J. et al. "1,3,2-Dioxagermetanes and Octamethylcyclotetragermoxanes." Journal of Chemical Research. vol. 31, No. 1, 1985, pp. 30-31 (2 pages).
Barrau, J. et al. "Tentatives De Synthese De L'Oxagermetanne-1,3 Mise En Evidence Probable De La Formation De Germaethene." Synthesis and Reactivity in Inorganic, Metal-Organic Chemistry. vol. 18, No. 4, 1988, pp. 317-324 (8 pages). [Abstract only].
Moedritzer, K. et al. "Scrambling of Oxygen with Halogens on Dimethylgermanium: Labile α, ω-Dihalopolydimethylgermoxanes." Inorganic Chemistry. vol. 4, No. 12, Dec. 1965, pp. 1753-1760 (8 pages).
Moedritzer, K. et al. "Linear Molecules Based on Dimethylgermanium and Dimethylsilicon Groups Bridged with Oxygen Atoms and Terminated with Chlorine Atoms." Journal of Polymer Science. vol. 6, No. 3, Mar. 1968, pp. 547-557 (9 pages).
Schmidbaur, H. "Recent Developments in the Chemistry of Hetereosiloxanes." Angewandte Chemie International Edition in English. vol. 4, No. 3, Mar. 1965, pp. 201-211 (11 pages).

(Continued)

*Primary Examiner* — Margaret Moore
(74) *Attorney, Agent, or Firm* — Nixon Peabody LLP

(57) ABSTRACT

Heteroelement siloxane polymers are described. The heteroelement siloxane polymers can have linear structure, cyclic structure, branched structure, and three-dimensional network structure and combinations thereof. The heterosiloxane polymers can be cured using curing chemistry derived from thermoset organosilicon polymers, and gels, coatings, plaques, parts and other useful articles can be prepared.

5 Claims, No Drawings

(56) References Cited

OTHER PUBLICATIONS

Vogel, A. I. et al. "Bond Refractions for Tin, Silicon, Lead, Germanium and Mercury Compounds." The Journal of Physical Chemistry. vol. 58, No. 2, Feb. 1954, pp. 174-177 (4 pages).

Schmidbaur, H. et al. "Präparative und Spektroskopische Untersuchungen an Alkylgermanosiloxanen." Journal of Organometallic Chemistry. vol. 1, No. 3, Jan. 1964, pp. 235-243 (9 pages). [Summary only].

Socrates, G. "Alkane Group Residues: C—H Group" and "Organic Silicon Compounds." in: Socrates, G., *Infrared Characteristic Group Frequencies: Tables and Charts* (Chichester, 1994), pp. 35, 188-189 (5 pages).

* cited by examiner

HETEROELEMENT SILOXANE COMPOUNDS AND POLYMERS

CROSS-REFERENCE TO RELATED APPLICATION

This application is a nationalization of PCT/US2008/052875 filed on Feb. 4, 2008, which claims benefit to U.S. Provisional Application No. 60/888,784, filed on Feb. 8, 2007.

The present invention relates generally to siloxane compounds and more particularly to heteroelement siloxane compounds and to methods of making heteroelement siloxane compounds and heteroelement siloxane polymers. The present invention also relates to methods to control and increase the refractive index of polymers based on elements from Groups IIB, IIIA, IVA, IVB, VB, and VIB.

High refractive index (RI) materials are desirable for a number of applications, particularly in the electronics and photonics areas. For example, in the fabrication of semiconductor based light emission devices, polymers are used to match the light transfer from the semiconductor device (e.g., sapphire, gallium nitride, gallium arsenide, and gallium phosphide with RI ranges of 1.8-4.0 in the wavelength range 400-700 nm) to the lens. Without an index matching polymer, reflective losses will occur, and the extracted light efficiency is low. Ability to control the RI of the polymer would allow engineers to have control over the light extraction properties of the system. Siloxane polymers exhibit a small range of refractive index in the visible wavelength range (c.a. 1.35-1.65 at 632 nm) which is most influenced by density and relative amounts of Si—O and Si-organic bond content. Current methyl siloxanes have a RI of about 1.4, and phenyl siloxanes have a RI of less than 1.6. These values are below the RI values which are desirable to improve light extraction efficiency.

Another example is the formation of an optical waveguide, which can be in the form of a multilayer film or a cladded fiber. In the cladded fiber, a lower RI material surrounds a higher RI material so that the light energy travels primarily in the high RI material. In this application, the ratio of RI between the high and low RI materials should be maximized so that the light energy propagates with maximum efficiency.

According to one approach, the need for higher RI polymeric materials is being addressed using inorganic nanoparticles with high refractive index, such as $TiO_2$. Although it is theoretically possible to achieve a composite with tunable refractive index values using this approach, there are a number of problems that must be overcome. First, the supply of high refractive index nanoparticles is limited. Adding high RI particles to a low RI matrix can raise the composite RI, but the process is inefficient due to light scattering effects. Particle agglomeration can be a problem with nanoparticles, and surface functionalization is often required to improve dispersion in a given matrix. However, this is not easy with nanoparticles other than silica. Furthermore, surface functionalization impacts the crystalline nature of the particles, and, as a result, usually decreases their refractive index. Moreover, the stability of particle dispersion is frequently limited and susceptible to the effect of other additives in the formulation. Finally, the rheological and other properties of the matrix can be altered as the volume fraction of nanoparticles changes.

Considering the complications of the incorporation of nanoparticles into a polymer matrix, a more desirable approach might be to build a polymer with a plurality of inorganic-organic constituents with different electronic polarizability which can be chosen to adjust the refractive index of the polymer. The refractive index of a dielectric material is proportional to the molecular polarizabilities and the density. Using molecular engineering to design the refractive index is an efficient way to manage the optical properties.

One strategy to realize refractive index molecular engineering is to incorporate group IV or group IVB based metal-organic species into the siloxane polymer backbone, for example, the incorporation of germoxane species -($Me_2$GeO)— within a siloxane polymer. Comparatively, the bond refractions of Ge—O and Ge—C are 2.47 and 3.05 compared to those for Si—O and Si—C bonds of 1.80 and 2.52. The bond refractions are linked to increased polarizability, and thus, if chemically coupled in a polymer, the incorporation of the Ge substituents above would raise the refractive index relative to the pure siloxane polymer. Sn—O, Sn—C, Ti—O and Ti—C bonds have higher refractions than their Si and Ge analogs.

Another benefit of the heteroelement siloxane polymers over traditional siloxanes is the modification of their solubility.

For example, introducing dimethylgermoxane units into siloxane polymers has the potential to produce polymers with altered solubility behavior towards acid and base hydrolysis. Modified solubility behavior could offer advantages related to the environmental fate of germanosiloxane polymers. The Si—O—Ge bridge is more rapidly hydrolyzed than the Si—O—Si bridge, in both acidic and basic media. As a result, a small amount of $Me_2$Ge—O—Si bridges in a siloxane polymer could increase the degradation kinetics.

However, there is limited research on dimethylgermoxane chemistry. IR and molecular weight determination data on a cyclic compound ($[Me_2GeO]_4$) has been reported. Cyclic germanoxane compounds have been reported as precursors for oxagermetanes. A published patent application (WO 93/02088) discusses the use of germoxane compounds as biocompatible oils.

Literature on the synthesis of germanosiloxane and other group IV-IVB heteropolymers is limited. Also, there is limited success reported for the use of co-hydrolysis as a method for making, for example, germanosiloxane polymers. This is attributed to the reversion of Ge—O to Ge—Cl under neutral or acidic conditions. The limited success of co-hydrolysis led to the use of organosiloxides with organohalogen germanes to form Si—O—Ge bonds. However, this method is expensive and can only produce compounds with one Si—O—Ge bond.

Several patents discussed synthesis of germanosiloxane polymers and resins for use in electronic and optical applications. U.S. Pat. No. 7,057,002 describes a siloxane-based resin prepared by hydrolyzing and polycondensing a first monomer of Formula A and a second monomer of Formula B in an organic solvent in the presence of an acid or alkaline catalyst and water:

Formula A wherein, $R_1$ is hydrogen atom, $C_{1-3}$ alkyl group or $C_{6-15}$ aryl group; each of $X_1$, $X_2$ and $X_3$, independently, is $C_{1-3}$ alkyl group, $C_{1-10}$ alkoxy group, or halogen atom, provided that at least one of them is hydrolysable; m is an integer from 0 to 10; and p is an integer from 3 to 8, and

Formula B wherein, $R_2$ is hydrogen atom, $C_{1-3}$ alkyl group, or $C_{6-15}$ aryl group; $X_4$ is $C_{1-10}$ alkoxy group, or halogen atom; and a is an integer of 1-4. The goal of this approach was to develop a means to improve the mechanical properties of a film made from the modified silicon polymer without alteration of the original electronic properties (dielectric constant) relative to the process absent of germanium. Low density, low dielectric constant siloxane polymer films were obtained.

WO 97/22653 is directed primarily to methods of forming carboxyl containing polydialkylgermanosiloxanes. It teaches a method for producing a polygermanosiloxane composition. The method involves hydrolyzing an alkylgermanium oxide compound in a polar solvent and combining that solution with a solution of an alkylhalosilane or an alkylalkoxysilane in a second solvent that is immiscible with the polar solvent, and isolating the product from the second solvent. The composition can have the formula:

$$-(R_1R_2GeO)_n(R_3SiO)_m-$$

in which $R_1$-$R_4$ are identical or different alkyl, alkenyl, and functionalized alkyl and alkenyl radicals such as vinyl and cyanoalkyl radicals, including cyanopropyl, and n or m is a positive integer with n+m larger than 3, and n/(n+m) ranging from 0.01-0.60.

There remains a need for basic polymers with high refractive index and for practical methods of making the polymers.

That need is met by the present invention which provides basic heteroelement siloxane polymers of linear structure, cyclic structure, branched structure, and three-dimensional network structure and combinations therefrom. The need is met also by methods of preparing heteroelement siloxane polymers. The need is met also by curing the heterosiloxane polymers using curing chemistry derived from thermoset organosilicon polymers and preparing gels, coatings, plaques, parts and other useful articles. The heteroelement siloxane polymers can be used as matrices in reinforced systems analogous to those described in the organosiloxane chemistry. The reinforcement can be discontinuous (i.e. with particles such as silica) or continuous (i.e. with glass fibers or carbon fibers), and make useful elastomers, rubbers, composites, etc.

The invention relates generally to heteroelement siloxane compounds, more specifically to heteroelement siloxane compounds made from heteroelement siloxane polymers, and to methods of making heteroelement siloxane polymers. Heteroelement siloxane polymers are siloxane polymers modified with metals as well as main group elements that carry organic substituents. Heteroelement siloxane polymers include Si—O—Si bonds, as well as M-O—Si bonds and/or M-O-M bonds, where M is a heteroelement selected from Groups IIB, IIIA, IVA, IVB, VB, and VIB. Preferred heteroelements include, but are not limited to, Groups IVA, IVB, and V, Nb, Ta, Mo, W, Zn, Al, Ga, In, Tl. For the sake of convenience, the discussion will focus on siloxane polymers modified with germanium-based organic species. However, those of skill in the art will recognize that the polymers and methods would apply to other Group IIB, IIIA, IVA, IVB, VB, and VIB elements as well.

The heteroelement siloxane polymer comprises silicon, oxygen and a Group IIB, IIIA, IVA, IVB, VB, and VIB element in the backbone. Heteroelement siloxane compounds can be made into articles, including, but not limited to, coatings, films, gels, plaques, or fibers. Heteroelement siloxane compounds are made from the heteroelement siloxane polymer. Heteroelement siloxane compounds can be cured, or uncured, or pyrolyzed in an inert or reactive gas ambient. A coating is the application of the heteroelement siloxane precursor polymer to a non-planar surface or 3 dimensional object. A film is the application of the heteroelement siloxane precursor polymer to a relatively planar article or surface like a semiconductor wafer or glass substrate. A gel is a bulk material product resulting from a curing reaction on a heteroelement siloxane precursor polymer.

The heteroelement siloxane polymers can be used as formed. Alternatively, the heteroelement siloxane polymers can be used as precursors for further reactions. Additional chemistry (curing agents, etc.) can be applied to the precursor polymer to convert it to a "curable" material, and then the curing process converts the material to a highly crosslinked polymer material, which can take on various forms, including but not limited to bulk, coating, or film. These processes are well known in the art. Alternatively, additional chemistry can be applied to the precursor polymer to convert it to a gel. The methods to this are well known to those skilled in the art. The heteroelement gel material is used to form coatings, or films, and the like using any technique which would be known by those who practice film technology. The coating/film can be cured using heat, UV, reactive gases, etc to form a highly crosslinked coating/film.

One type of germanosiloxane polymer of the present invention can be represented by the general formula:

$$(R_1R_2SiO)_n(R_3GeO)_m \quad \text{Formula I}$$

wherein $R_1$, $R_2$, $R_3$ and $R_4$ are independently selected from the following groups: (A) $C_1$ to $C_{10}$ hydrocarbyl group or a $C_1$ to $C_{10}$ halogen-substituted hydrocarbyl group or hydrogen. The $C_1$ to $C_{10}$ hydrocarbyl group and $C_1$ to $C_{10}$ halogen-substituted hydrocarbyl group represented by $R_1$, $R_2$, $R_3$ and $R_4$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$, $R_2$, $R_3$ and $R_4$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R_1$, $R_2$, $R_3$ and $R_4$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl; and (B) Alkenyl groups, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl. The subscripts m and n are integers greater than or equal to 1.

The germanosiloxane polymer has a cyclic ring structure, with no terminal groups. The ring size (the sum of n+m) can be as high as 48, more commonly it is less than 30, or more commonly less than 25, or more commonly less than 12, or more commonly in the range of 3-8. The Si—O and Ge—O units can be randomly arranged within the cyclic ring or arranged in a block fashion (i.e., Ge—O units grouped together followed by Si—O units and so on). The polymer can be a mixture of cyclic structures, as well as various proportions of cyclic species of different ring sizes.

These polymers can be prepared from the reaction of precursors that have the general formula $R_1R_2SiX'_2$ and $R_3R_4GeX''_2$, where X' and X" are independently selected from halogens, and alkoxy groups. The halogen is commonly chloride, but it can also be bromide, iodide, or fluoride. Suitable alkoxy groups include, but are not limited to, methoxy, ethoxy, acetoxy, isopropoxy, butoxy, and others. The precursors are hydrolyzed and condensed via a method that involves a two phase solvent system including a non-polar organic solvent or mixtures of non-polar solvents and an aqueous phase, under basic conditions. Suitable non-polar solvents include, but are not limited to, toluene, benzene, heptane, petroleum ether, and others. The basic conditions catalyze the hydrolysis of the precursors and also consume the acidic species which are generated via a neutralization pathway. This ensures that reversion of the Ge—O bonds (and to a lesser extent Si—O bonds) back to Ge—X or Si—X (the precursor state) is minimized.

Those of skill in the art will recognize that the addition of the halosilane and halogermane precursors can be done simultaneously or sequentially. The sequential addition can be done by hydrolyzing the silane precursor first (and thus producing a siloxane oligomer) or the germane precursor first (and thus producing a germoxane cyclic oligomer). The order of addition will have an effect on the arrangement of the SiO and GeO groups in the cyclic germanosiloxane rings.

In a variation of the synthetic method, the halogen-bearing precursors can be converted to alkoxy-bearing precursors by solvolysis into a corresponding alcohol solvent. Suitable solvents include, but are not limited to, methanol, ethanol, isopropanol butanol, and others. The alkoxide precursors that form can subsequently be hydrolyzed in an analogous way as the halide precursors above to produce the germanosiloxane polymers of Formula I above. Those of skill in the art will recognize that the hydrolysis/condensation reactions of the precursors can also take place under neutral or acidic conditions, but that this will compromise the reaction kinetics (for example, in the case of the neutral conditions), and that due to the reversibility of the reactions, there could be significant deviations from the pre-determined (desired) stoichiometry of the germanosiloxane polymers.

Another type of germanosiloxane polymer of the present invention can be represented by the general formula:

$$R_5R_6R_7ZO-(R_1R_2SiO)_m(R_3R_4GeO)_n-ZR_5R_6R_7 \quad \text{Formula II}$$

wherein $R_1$, $R_2$, $R_3$, and $R_4$ are independently selected from the following groups: (A) $C_1$ to $C_{10}$ hydrocarbyl group or a $C_1$ to $C_{10}$ halogen-substituted hydrocarbyl group or hydrogen. The $C_1$ to $C_{10}$ hydrocarbyl group and $C_1$ to $C_{10}$ halogen-substituted hydrocarbyl group represented by $R_1$, $R_2$, $R_3$ and $R_4$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$, $R_2$, $R_3$ and $R_4$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R_1$, $R_2$, $R_3$ and $R_4$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl; and (B) Alkenyl groups, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl; $R_5$, $R_6$, $R_7$ are independently selected from $R_1$, $R_2$, $R_3$ and $R_4$, and also can include hydroxide groups; and Z is independently selected from Si or Ge.

The polymer of Formula II has a linear structure. The polymer of Formula II can have n in the range of 1% to 99% and simultaneously m can range from 99% to 1%. The polymer of Formula II can range in number average molecular weight (MW) from low MW (lower limit when m+n=2) to a very high molecular weight polymer (e.g., when m+n>10,000, the polymer can have a MW in the millions).

The ratio of Si—O/Ge—O groups is one factor to determine the extent to which these polymers will achieve very high molecular weight values. For instance, when the ratio of the Si—O/Ge—O groups is low, then it is very likely that the polymers become solids, and thus the polymerization stops. Another set of factors that control the molecular weight growth of the polymers are the conditions of the reactions (primarily, temperature, time, type of solvents and type and level of catalysts.

The germanosiloxane polymer can contain the SiO and GeO groups in a random arrangement or in a block arrangement.

The linear germanosiloxane polymer can be prepared using a method analogous to one known in organosilicon chemistry as ring opening polymerization. According to this method, cyclic germanosiloxane polymers, such as those described in Formula I above, can be made to undergo ring opening by the use of suitable catalysts including, but not limited to, acidic or basic catalysts, or salts of acids or bases. Acid catalysts include, but are not limited to Arrhenius type (proton donors), such as sulfuric acid ($H_2SO_4$) or acetic acid ($CH_3COOH$), or trifluoroacetic acid ($CF_3COOH$) or Lewis type acids (electron acceptors), such as ferric chloride ($FeCl_3$) or aluminum chloride ($AlCl_3$). These can act homogeneously or heterogeneously. An example of a heterogeneous acid useful in the formation of the germanosiloxane polymers of Formula II is aluminosilicate clay, such as bentonite clay. Examples of basic catalysts include, but are not limited to, amines, such as ammonia ($NH_3$), or methylamine ($CH_3NH_2$), phosphines, and alkali metal and alkali earth hydroxides, such as KOH or CsOH. Examples of salt catalysts include, but are not limited to, silanolates, such as potassium silanolate, acetates, such as sodium acetate, or ammonium or phosphonium salts, such as tetrabutyl ammonium chloride or tetraethyl phosphonium bromide, etc. Those of skill in the art will recognize that the examples are not intended to limit the scope of the method, and that a much longer list of catalysts can be used to carry out the ring opening polymerization reactions.

The reaction takes place in organic media, both non-polar and polar, and mixtures of solvents. Suitable solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene, and other solvents such as isopropanol, butanol, and petroleum ether.

In addition to the starting germanosiloxane polymer of Formula I, the reaction mixture also contains end-blocker groups or end-blocker precursors that are added to the reaction within a pre-determined timeframe to ensure adequate growth of the linear polymer. Numerous end-blockers exist and are generally of the type $R_5R_6R_7ZX$ or $R_5R_6R_7Z$—O—$ZR_7R_6R_5$, where Z is independently selected from Ge or Si, and X is typically a halide, an alkoxide, or a hydroxide. Some typical examples of end-blockers for the polymer of Formula II include, but are not limited to, $Me_3SiCl$, $Me_3GeCl$, or $(ViMe_2Si)_2O$ where Me=methyl group ($CH_3$—) and Vi=vinyl group ($CH_2$=CH—). Those skilled in the art will recognize that the preparation of polymers of Formula II can be carried out without the separation of the cyclic germanosiloxane polymers of Formula I from the reaction vessel. In other words, polymers having Formula II can result directly from the reaction of precursors $R_1R_2SiX_2$ and $R_3R_4GeX_2$ (and end-blocker precursors) under the appropriate reaction conditions. The product may need to be distilled for purification and separation of cyclic from linear components.

A variation of the method to produce the germanosiloxane polymer of Formula II involves independently making siloxane cyclic species and germoxane cyclic species and then reacting them in a suitable solvent system (such as those described above) in the presence of a suitable ring opening catalyst (such as those described above). The germanosiloxane polymers produced with this method contain random blocks of $(R_1R_2SiO)_x$ and $(R_3R_4GeO)_y$ connected via Si—O—Ge bridges. In the latter formulas, x and y are the number of SiO and GeO blocks. End-blockers are used similarly to the method described above.

Another method to prepare the germanosiloxane polymers of Formula II is to react linear polysiloxane precursors that bear reactive terminal groups such as halides, hydroxyl groups, or alkoxy groups with germanium precursors such as $R_3R_4GeX_2$ or cyclic germoxane compositions. When X represents a halide such as chloride, the reactions are preferred to take place under basic conditions to consume the generated acid and drive the condensation reaction to the right. When X represents an alkoxide, the reaction is also preferred to be carried out under basic conditions, but neutral or acidic conditions can be considered.

An example of a linear siloxane polymer for use in the above method can be represented by the formula HO—$(SiMe_2O)_z$—$SiMe_2OH$ (z=100). To the extent that the reports of the existence of high molecular weight germoxane polymers are shown to be valid (see reference by Brown and Rochow in J. Am. Chem. Soc. 1955, 82, 4166), then an alternative method for the preparation of the germanosiloxane polymer represented by Formula II is the condensation of linear siloxane polymers bearing functional terminal groups useful to condensation such as hydroxyl groups or alkoxy groups with linear high molecular weight germoxane polymers bearing analogous terminal hydroxyl or alkoxy groups.

Another type of germanosiloxane polymer of the present invention can be represented by the general formula:

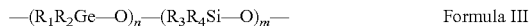

Formula III wherein $R_1$, $R_2$, $R_3$, and $R_4$ are independently selected from the following groups: (A) $C_1$ to $C_{10}$ hydrocarbyl group or a $C_1$ to $C_{10}$ halogen-substituted hydrocarbyl group or hydrogen. The $C_1$ to $C_{10}$ hydrocarbyl group and $C_1$ to $C_{10}$ halogen-substituted hydrocarbyl group represented by $R_1$, $R_2$, $R_3$ and $R_4$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$, $R_2$, $R_3$ and $R_4$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R_1$, $R_2$, $R_3$ and $R_4$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl; and (B) Alkenyl groups, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl. The subscripts m and n are positive integers with n+m larger than 3, and n/(n+m) being greater than 0.60.

The germanosiloxane polymer of Formula III contains reactive terminal groups which are pre-determined from the method of preparation, and are most commonly halides or hydroxides. The polymers of Formula III are usually known as hydrolyzates in the terminology of organosilicon chemistry. Their method of preparation is analogous to those described for Formula II above, but without the addition of end-blocked terminal groups.

Another type of germanosiloxane polymer of the present invention can be represented by the general formula:

Formula IV wherein $R_1$, $R_2$, $R_3$, and $R_4$ are independently selected from the following groups: (A) $C_1$ to $C_{10}$ hydrocarbyl group or a $C_1$ to $C_{10}$ halogen-substituted hydrocarbyl group or hydrogen. The $C_1$ to $C_{10}$ hydrocarbyl group and $C_1$ to $C_{10}$ halogen-substituted hydrocarbyl group represented by $R_1$, $R_2$, $R_3$ and $R_4$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$, $R_2$, $R_3$ and $R_4$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R_1$, $R_2$, $R_3$ and $R_4$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl; and (B) Alkenyl groups, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl. At least one of $R_8$ and $R_9$ are hydrido or aryl or substituted aryl groups; Z is independently selected from Ge or Si; n, m, and p are positive integers with n+m>3, n/n+m+p ranging from 0.01 to 0.99 and p≥1. The methods of preparation of the germanosiloxane polymer of Formula IV are analogous to those described above for the polymer of Formula II. For a polymer of Formula IV, examples of precursors include, but are limited to, $HMeSiCl_2$ or $PhMeSiCl_2$ or $HPhSiCl_2$ or $HMeGeCl_2$ or $HPhGeSiCl_2$ where Me is methyl and Ph is phenyl. Other typical examples of the precursors are $Me_2SiCl_2$ and $Me_2GeCl_2$. In the absence of end block groups, the germanosiloxane polymer is a hydrolyzate and has reactive terminal groups, most commonly hydroxyl, chloride, or alkoxy groups.

Another type of germanosiloxane polymer of the present invention can be represented by the general formula:

$$-(R_1R_2SiO)_m(R_3R_4GeO)_n(R_{10}ZO_{3/2})_q-$$  Formula V wherein $R_1$, $R_2$, $R_3$, $R_4$, and $R_{10}$ are independently selected from the following groups: (A) $C_1$ to $C_{10}$ hydrocarbyl group or a $C_1$ to $C_{10}$ halogen-substituted hydrocarbyl group or hydrogen. The $C_1$ to $C_{10}$ hydrocarbyl group and $C_1$ to $C_{10}$ halogen-substituted hydrocarbyl group represented by $R_1$, $R_2$, $R_3$ and $R_4$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$, $R_2$, $R_3$ and $R_4$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R_1$, $R_2$, $R_3$ and $R_4$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl; and (B) Alkenyl groups, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl. Z is independently selected from Ge or Si; m, n and q are positive integers; and m+n+q is greater than 4. The integer q denotes the number of branched points in the network. Those skilled in the art will recognize that the higher the number of crosslinking points (higher number of q), the higher the viscosity, and processing issues may need to be addressed. Also, the distance between crosslinking points impacts the rheological properties of the materials.

The method of preparation of the germanosiloxane branched polymers is analogous to the one described for the polymers in Formula II with the additional incorporation of precursors with the general formula $R_{10}ZX_3$, where X is a halogen (more often chloride), a hydroxide group, or an alkoxy group (such as methoxy or ethoxy or acetoxy, etc.). Examples of $R_{10}ZX_3$ precursors include, but are not limited to, $MeSiCl_3$ or $PhSiCl_3$ or $MeGeCl_3$ or $PhGeCl_3$ or $MeSi(OMe)_3$ or $MeGe(OMe)_3$, etc. When no end-block precursor groups are used, then the germanosiloxane branched polymer has numerous terminal functional groups which are reactive, such as chloride, hydroxide, or alkoxide groups. When end-block precursor groups are used in the reaction mixture, then the branched germanosiloxane polymer does not have terminal groups that are reactive.

Another type of germanosiloxane polymer of the present invention is of a resinous structure and is typically a polymer containing T and/or Q siloxane and/or germoxane units in combination with M and/or D siloxane and/or germoxane units. The germanosiloxane resin can be of two general cure types: (a) a hydrosilylation curable type, and (b) a condensation curable type. The two cure types are commercially very useful. Other cure types can be used, such as peroxide cure or radical cure or electron-beam cure, etc. Those skilled in the art are familiar with these and other cure systems. The general formula for both of these types of resins can be given by the general formula:

$$[(R_1R_2R_2SiO_{1/2})_w(R_1'R_2'R_2'GeO_{1/2})_v(R_2R_2SiO)_y$$
$$(R_2'R_2'GeO)_x(R_1SiO_{3/2})_z(R_1'GeO_{3/2})_r(SiO_{4/2})_s$$
$$(GeO_{4/2})_t]$$  Formula VI wherein w, v, y, x, z, r, s, t are mole fractions predetermined by the quantity of the hydrolysable precursor and at least one of v, x, r or t is not zero. In the above formula, the $R_n$ and $R_n'$ groups are not necessarily identical, but typically they are. In this designation, $R_n'$ groups are bonded to the germanium nuclei and $R_n$ groups are bonded to the silicon nuclei.

The germanosiloxane resin, which is curable via hydrosilation, has silicon (and/or germanium) bonded alkenyl groups or silicon (and/or germanium) bonded hydrogen atoms. The germanosiloxane resin typically includes $R_1SiO_{3/2}$ units (and/or $R_1'GeO_{3/2}$ units), (i.e., T units), and/or $SiO_{4/2}$ units (and/or $GeO_{4/2}$ units), (i.e., Q units), in combination with $R_1R_2R_2SiO_{1/2}$ units (and/or $R_1'R_2'R_2'GeO_{1/2}$ units), (i.e., M units), and/or $R_2R_2SiO$ units (and/or $R_2'R'_2GeO$ units), (i.e., D units), wherein $R_1$ and $R_1'$ are $C_1$ to $C_{10}$ hydrocarbyl groups or $C_1$ to $C_{10}$ halogen-substituted hydrocarbyl group, both free of aliphatic unsaturation, $R_2$ and $R_2'$ are $R_1$ or $R_1'$ groups, alkenyl groups, or hydrogen. For example, the germanosiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin. As used herein, the term "free of aliphatic unsaturation" means the hydrocarbyl or halogen-substituted hydrocarbyl group does not contain an aliphatic carbon-carbon double bond or carbon-carbon triple bond.

The $C_1$ to $C_{10}$ hydrocarbyl group and $C_1$ to $C_{10}$ halogen-substituted hydrocarbyl group represented by $R_1$ and $R_1'$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R_1$ and $R_1'$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenylethyl. Examples of halogen-substituted hydrocarbyl groups represented by $R_1$ and $R_1'$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R_2$ and $R_2'$, which may be the same or different within the germanosiloxane resin, typically have from 2 to about 10 carbon atoms, alternatively from 2 to 6 carbon atoms, and are exemplified by, but not limited to, vinyl, allyl, butenyl, hexenyl, and octenyl. In another embodiment $R_2$ and $R_2'$ can be predominately hydrogen. The following are examples of Formula VI of resins of the hydrosilation curable type:
$(Vi_2MeSiO_{1/2})_{0.15}(Vi_2MeGeO_{1/2})_{10}((PhSiO_{3/2})_{0.75}$,
$(ViMe_2SiO_{1/2})_{0.25}(PhSiO_{3/2})_{0.50}(PhGeO_{3/2})_{0.25}$,
$(ViMe_2SiO_{1/2})_{0.25}(MeGeO_{3/2})_{0.25}(PhSiO_{3/2})_{0.50}$,
$(ViMe_2SiO_{1/2})_{0.15}(PhSiO_{3/2})_{0.75}(GeO_{4/2})_{0.1}$, and
$(Vi_2MeGeO_{1/2})_{0.15}(ViMe_2SiO_{1/2})_{0.1}(PhSiO_{3/2})_{0.75}$
$(HMe_2SiO_{1/2})_{0.25}(PhSiO_{3/2})_{0.25}(PhGeO_{3/2})_{0.25}$,
$(HMeGeO_{2/2})_{0.3}(PhSiO_{3/2})_{0.6}(MeSiO_{3/2})_{0.1}$, and
$(Me_3SiO_{1/2})_{0.1}(H_2SiO_{2/2})_{0.1}(MeSiO_{3/2})_{0.4}(PhGeO_{3/2})_{0.4}$ The germanosiloxane resin represented by Formula VI typically has a number-average molecular weight ($M_n$) of from about 500 to about 50,000, alternatively from about 500 to about 10,000, alternatively from about 1,000 to about 3,000, where the molecular weight is determined by gel permeation chromatography employing a low angle laser light scattering detector, or a refractive index detector and silicone resin (MQ) standards.

Methods of preparation of the germanosiloxane resins involve cohydrolysis of the appropriate mixture of hydrolysable precursors, such as chlorosilane and chlorogermane precursors, in an appropriate organic solvent, preferably under basic conditions in order to neutralize the generated acid. After separation of the aqueous layer from the organic layer and further neutralization of the organic layer (by washing with water or addition of base), the germanosiloxane hydrolyzate is allowed to 'body' (increase in molecular weight), usually by applying heat and/or of the use of a condensation catalyst. During the 'bodying' process, the hydroxyl groups that are present in the hydrolyzate condense producing siloxane and/or germoxane and/or germanosiloxane bonds and $H_2O$.

The hydrosilation curable germanosiloxane resin typically uses a cross-linking agent and a hydrosilation catalyst to cure into a final form, such as a thermoset gel, a coating, a film, a plaque, a fiber, or any other useful form. The cross-linking agent could be a compound that has silicon-bonded hydrogen atoms (and/or germanium bonded hydrogen atoms) capable of reacting with the silicon-bonded alkenyl groups and the germanium-bonded alkenyl groups of the germanosiloxane resin. The cross-linking agent could also be a compound that has silicon-bonded alkenyl groups (and/or germanium-bonded alkenyl groups capable of reacting with the silicon-bonded (and/or germanium-bonded hydrogen atoms) of the germanosiloxane resin. When $R_2$ and $R_2'$ are alkenyl, the cross-linking agent has an average of at least two silicon (and/or germanium)-bonded hydrogen atoms per molecule, alternatively at least three silicon (and/or germanium)-bonded hydrogen atoms per molecule. It is generally understood that cross-linking occurs when the sum of the average number of alkenyl groups per molecule in the germanosiloxane and the average number of silicon (and/or germanium)-bonded hydrogen atoms per molecule in the cross-linking agent is greater than four. The cross-linking agent is present in an amount sufficient to cure the germanosiloxane resin.

The cross-linking agent is typically an organosilicon compound, and may be further defined as an organohydrogensilane, an organohydrogensiloxane, or a combination thereof. The cross-linking agent can also be an organogermanium compound, and maybe further defined as an organohydrogengermane, an organohydrogengermoxane, or a combination thereof. The cross-linking agent can also be an organogermosilane compound and maybe further defined as an organohydrogengermosilane, an organohydrogengermanosiloxane, or a combination thereof. The structure of the organosilicon compound and/or the organogermanium compound and/or the organogermosilane compound can be linear, branched, cyclic, or resinous. In acyclic polysilanes, polygermanes, polysiloxanes, polygermoxanes, polygermosilanes, and polygermanosiloxanes, the silicon-bonded hydrogen atoms and the germanium-bonded hydrogen atoms can be located at terminal, pendant, or at both terminal and pendant positions. Cyclosilanes, cyclogermanes, cyclosiloxanes, and cyclogermoxanes typically have from 3 to 12 silicon (or germanium) atoms, alternatively from 3 to 10 silicon (or germanium) atoms, or alternatively from 3 to 4 silicon (or germanium) atoms.

The organohydrogensilane can be a monosilane, disilane, trisilane, or polysilane. The organohydrogengermane can be a monogermane, digermane, trigermane or polygermane. When $R_2$ and $R_2'$ are predominantly alkenyl groups, examples of organohydrogensilanes that are suitable for purposes of the present invention include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. Examples of organohydrogengermanes that are suitable for purposes of the present invention include, but are not limited to, diphenylgermane, diethylgermane, di-n-butylgermane, and t-butylgermane. Those skilled in the art will also recognize that hydrogen-bearing germanosilanes could be suitable crosslinking agents for this type of germanosiloxane resins.

When $R_2$ and $R_2'$ are predominantly hydrogen, examples of alkenyl-bearing silanes that are suitable for purposes of the present invention include, but are not limited to, silanes having the following formulae:

$Vi_4Si$, $PhSiVi_3$, $MeSiVi_3$, $PhMeSiVi_2$, $Ph_2SiVi_2$, and $PhSi(CH_2CH=CH_2)_3$, wherein Me is methyl, Ph is phenyl, and Vi is vinyl. Examples of alkenyl-bearing germanes that are suitable for the purpose of the present invention include, but are not limited to germanes such as tetraallylgermane. Those skilled in the art will also recognize that alkenyl-bearing germanosilanes could be suitable crosslinking agents for this type of germanosiloxane resins.

The organohydrogensilane can also have the formula:

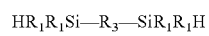

$HR_1R_1Si—R_3—SiR_1R_1H$                                    Formula VII wherein $R_1$ is as defined and exemplified above and $R_3$ is a hydrocarbylene group free of aliphatic unsaturation having a formula selected from the following structures:

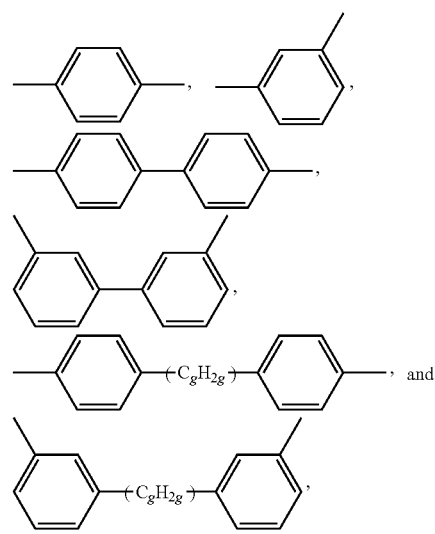

wherein g is from 1 to 6.

Specific examples of organohydrogensilanes having the Formula VII, wherein $R_1$ and $R_3$ are as described and exemplified above include, but are not limited to, organohydrogensilanes having a formula selected from the following structures:

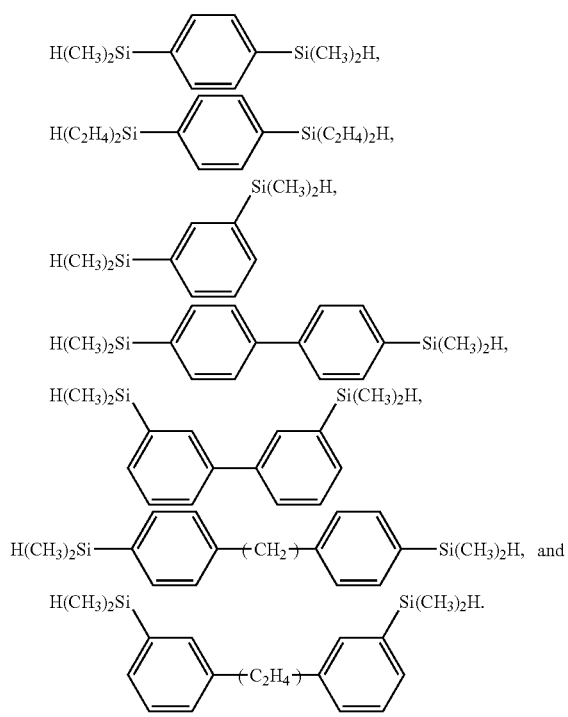

The reaction to form the organohydrogenpolysiloxane resin represented by Formula (IV) can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The silicone resin (a), organosilicon compound (b), hydrosilylation catalyst (c), and, optionally, organic solvent (d), can be combined in any order. Typically, organosilicon compound (b) and hydrosilylation catalyst (c) are combined before the introduction of the silicone resin (a) and, optionally, organic solvent (d). The reaction is typically carried out at a temperature of from about 0 to about 150° C., alternatively from about room temperature (~23±2° C.) to about 115° C. When the temperature is less than about 0° C., the rate of reaction is typically very slow. The reaction time depends on several factors, such as the structures of the silicone resin (a) and the organosilicon compound (b), and the temperature. The time of reaction is typically from about 1 to about 24 h at a temperature of from about room temperature (~23±2° C.) to about 150° C. The optimum reaction time can be determined by routine experimentation.

The hydrosilylation catalyst (c) can be any of the well-known hydrosilylation catalysts comprising a platinum group metal (i.e., platinum, rhodium, ruthenium, palladium, osmium and iridium), or a compound containing a platinum group metal. Preferably, the platinum group metal is platinum, based on its high activity in hydrosilylation reactions.

Examples of suitable hydrosilylation catalysts include, but are not limited to, the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin represented by Formula (IV), for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The concentration of hydrosilylation catalyst (c) is sufficient to catalyze the addition reaction of silicone resin (a) with organosilicon compound (b). Typically, the concentration of hydrosilylation catalyst (c) is sufficient to provide from about 0.1 to about 1000 ppm of a platinum group metal, alternatively from about 1 to about 500 ppm of a platinum group metal, or alternatively from about 5 to about 150 ppm of a platinum group metal, based on the combined weight of silicone resin (a) and organosilicon compound (b). The rate of reaction is very slow below about 0.1 ppm of platinum group metal. The use of more than about 1000 ppm of platinum group metal results in no appreciable increase in reaction rate, and therefore is not economical.

Organic solvent (d) is at least one organic solvent. The organic solvent (d) can be any aprotic or dipolar aprotic organic solvent that does not react with silicone resin (a), organosilicon compound (b), or the resulting organohydrogenpolysiloxane resin under the conditions of the present method, and is miscible with components (a), (b), and the organohydrogenpolysiloxane resin. Examples of organic solvents (d) that are suitable for purposes of the present invention include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as described above. The concentration of organic solvent (d) is typically from 0 to about 99% (w/w), alternatively from about 30 to about 80% (w/w), alternatively from about 45 to about 60% (w/w), based on the total weight of the reaction mixture.

The other type of curable germanosiloxane resin that is described by Formula VI is a condensation curable resin. The condensation-curable silicone resin typically includes a silicone resin having silicon-bonded hydroxy or hydrolysable groups and, optionally, a cross-linking agent having silicon-bonded hydrolysable groups and/or a condensation catalyst. The silicone resin is typically a polymer containing T and/or Q siloxane (and/or germoxane) units in combination with M and/or D siloxane (and/or germoxane) units. According to one embodiment, the germanosiloxane resin of Formula VI contains R and R' groups that are —H, —OH, or a hydrolysable group, and the resin has an average of at least two silicon-bonded (and/or germanium-bonded) hydrogen atoms, hydroxy atoms, or hydrolysable groups per molecule. As used herein the term "hydrolysable group" means the silicon (and/or germanium)-bonded group reacts with water in the absence of a catalyst at any temperature from about room temperature (~23±2° C.) to about 100° C. within several minutes, for example thirty minutes, to form a silanol (Si—OH) and/or a germanol (Ge—OH) group. Examples of hydrolysable groups include, but are not limited to, —Cl, —Br, —OR$_7$, —OCH$_2$CH$_2$OR$_7$, CH$_3$C(=O)O—, Et(Me)C=N—O—, CH$_3$C(=O)N(CH$_3$)—, and —ONH$_2$, wherein R$_7$ is C$_1$ to C$_8$ hydrocarbyl or C$_1$ to C$_8$ halogen-substituted hydrocarbyl.

The hydrocarbyl and halogen-substituted hydrocarbyl groups represented by R$_7$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by R$_7$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by R$_7$ include, but are not limited to, 3,3,3-trifluoropropyl, 3-chloropropyl, chlorophenyl, and dichlorophenyl.

Typically, at least 50 mol %, alternatively at least 65 mol %, alternatively at least 80 mol % of the groups in the germanosiloxane resin are hydrogen, hydroxy, or a hydrolysable group. As used herein, the mol % of groups is defined as a ratio of the number of moles of silicon (and/germanium)-bonded groups in the germanosiloxane resin to the total number of moles of the R and R' groups in the germanosiloxane resin, multiplied by 100.

Specific examples of condensation curable germanosiloxane resins include, but are not limited to, germanosiloxane resins having the following formulae:
(MeSiO$_{3/2}$)$_n$(MeGeO$_{3/2}$)$_m$, (PhSiO$_{3/2}$)$_n$(PhGeO$_{3/2}$)$_m$,
(Me$_3$SiO$_{1/2}$)$_{0.4}$(SiO$_{4/2}$)$_{0.1}$(Me$_3$GeO$_{1/2}$)$_{0.4}$(GeO$_{4/2}$)$_{0.1}$,
(MeSiO$_{3/2}$)$_{0.34}$(PhSiO$_{3/2}$)$_{0.16}$(MeGeO$_{3/2}$)$_{0.34}$(PhGeO$_{3/2}$)$_{0.16}$,
(MeSiO$_{3/2}$)$_{0.20}$(PhSiO$_{3/2}$)$_{0.20}$(Ph$_2$SiO$_{2/2}$)$_{0.10}$(PhMeSiO$_{2/2}$)$_{0.10}$(MeGeO$_{3/2}$)$_{0.10}$(PhGeO$_{3/2}$)$_{0.10}$(Ph$_2$GeO$_{2/2}$)$_{0.10}$(PhMeGeO$_{2/2}$)$_{0.10}$,

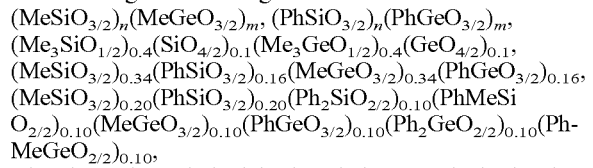

wherein Me is methyl, Ph is phenyl, the numerical subscripts outside the parenthesis denote mole fractions, and the subscript n has a value such that the silicone resin has a number-average molecular weight of from 500 to 100,000. The sequence of units in the preceding formulae is not to be viewed in any way as limiting to the scope of the invention.

As set forth above, the germanosiloxane resin represented by Formula VI typically has a number-average molecular weight (M$_n$) of from about 500 to about 100,000. Alternatively, the silicone resin may have a M$_n$ of from about 500 to about 10,000, alternatively about 1,000 to about 6,000, where the molecular weight is determined by gel permeation chromatography employing a low angle laser light scattering detector, or a refractive index detector and silicone resin (MQ) standards.

The condensation curable germanosiloxane resin represented by the Formula VI can be prepared by cohydrolyzing the appropriate mixture of hydrolysable silane and germane precursors in an organic solvent, preferably in the presence of a base sufficient to neutralize the acidic by-products that are typically generated by the hydrolysis reaction. The more commonly used hydrolysable precursors are chlorosilane precursors. For example, a germanosiloxane polymer resin containing R$_1$SiO$_{3/2}$ units, R$_1$'GeO$_{3/2}$ units and R$_1$R$_2$R$_2$SiO$_{1/2}$ units can be prepared by cohydrolyzing the precursors R$_1$SiCl$_3$, R$_1$'GeCl$_3$ and R$_1$R$_2$R$_2$SiCl$_3$ in an organic solvent such as petroleum ether in the presence of NaOH. Those skilled in the field will recognize that the kinetic differences of the hydrolysis reactions of chlorosilanes and chlorogermanes need to be taken into consideration to ensure the growth of the resin network with the desirable distribution/structure/organization of the siloxane and germanoxane units. 'Bodying' reactions such as those described above in the case of the hydrosilation curable resins could also be carried out with the hydrolyzates of the condensation curable germanosiloxane resins in an organic solvent in the absence or presence of condensation catalysts.

Examples of condensation catalysts include, but are not limited to, amines, and complexes of lead, tin, zinc, and iron with carboxylic acids. In particular, the condensation catalyst can be selected from tin(II) and tin(IV) compounds such as tin dilaurate, tin dioctoate, and tetrabutyl tin; and titanium compounds such as titanium tetrabutoxide. Typically these catalysts are used in low concentrations such as about 0.01 to about 10%.

As set forth above, the condensation-curable germanosiloxane resin can further comprise the cross-linking agent. The cross-linking agent can have the formula (R$_7$)$_q$SiX$_{4-q}$, wherein R$_7$ is C$_1$ to C$_8$ hydrocarbyl or C$_1$ to C$_8$ halogen-substituted hydrocarbyl, X is a hydrolysable group, and q is 0 or 1. The hydrocarbyl and halogen-substituted hydrocarbyl groups represented by R$_7$, and the hydrolysable groups represented by X are as described and exemplified above. The cross-linking agent can also have the formula (R$_7$')$_q$GeX$_{4-q}$ where in R$_7$' is as R$_7$ above. Specific examples of cross-linking agents include, but are not limited to, alkoxysilanes or alkoxygermanes such as MeSi(OCH$_3$)$_3$, (CH$_3$CH$_2$)$_2$Ge(OCH$_2$CH$_3$)$_2$, Ge(OCH$_2$CH$_3$)$_4$, Ge(OCH$_3$)$_4$, C$_6$H$_5$Si(OCH$_3$)$_3$.

The cross-linking agent can be one or more silanes one or more germanes or combinations thereof.

When present, the concentration of the cross-linking agent in the condensation-curable germanosiloxane resin is sufficient to cure (cross-link) the condensation-curable resin. The exact amount of the cross-linking agent depends on the desired extent of cure, which generally increases as the ratio of the number of moles of silicon (and germanium)-bonded hydrolysable groups in the cross-linking agent to the number of moles of silicon (and germanium)-bonded hydrogen atoms, hydroxy groups, or hydrolysable groups in the germanosiloxane resin increases. The optimum amount of the cross-linking agent can be readily determined by routine experimentation.

In yet another embodiment, the germanosiloxane resin described by the Formula VI may be a free radical-curable germanosiloxane resin. Examples of free radical-curable germanosiloxane resins include, but are not limited to, peroxide-curable germanosiloxane resins, radiation-curable germanosiloxane resins containing a free radical photoinitiator, and high energy radiation-curable germanosiloxane resins. Typically, the free radical-curable germanosiloxane resin comprises a germanosiloxane resin and, optionally, a cross-linking agent, and/or a free radical initiator (e.g., a free radical photoinitiator or organic peroxide).

The germanosiloxane resin can be any germanosiloxane resin that can be cured (i.e., cross-linked) by at least one method selected from (i) exposing the germanosiloxane resin to radiation having a wavelength of from about 200 to about 800 nm in the presence of a free radical photoinitiator, (ii) heating the germanosiloxane resin in the presence of an organic peroxide, and (iii) exposing the germanosiloxane resin to an electron beam. The germanosiloxane resin is typically a polymer containing T units and/or Q units in combination with M and/or D units.

For example, the germanosiloxane resin described by the Formula VI can include alkenyl or alkynyl groups. The alkenyl groups can be the same as those described above for the groups $R_2$ and $R_2'$. The alkynyl groups may be the same or different, typically have from 2 to about 10 carbon atoms, alternatively from 2 to 6 carbon atoms, and are exemplified by, but not limited to, ethynyl, propynyl, butynyl, hexynyl, and octynyl.

The free radical initiator is typically a free radical photoinitiator or an organic peroxide. Further, the free radical photoinitiator can be any free radical photoinitiator capable of initiating cure (cross-linking) of the germanosiloxane resin upon exposure to radiation having a wavelength of from about 200 to about 800 nm. Examples of free radical photoinitiators include, but are not limited to, benzophenone, halogenated benzophenone, and acetophenone. The free radical photoinitiator can also be a polysilane such as a phenylmethylpolysilanes. The free radical photoinitiator can be a single free radical photoinitiator or a mixture comprising two or more different free radical photoinitiators. The concentration of the free radical photoinitiator is typically from 0.1 to 6% (w/w), alternatively from 1 to 3% (w/w), based on the weight of the germanosiloxane resin.

The free radical initiator can also be an organic peroxide. Examples of organic peroxides include, but are not limited to, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate. The organic peroxide can be a single peroxide or a mixture comprising two or more different organic peroxides. The concentration of the organic peroxide is typically from about 0.1 to about 5% (w/w), alternatively from about 0.2 to about 2% (w/w), based on the weight of the germanosiloxane resin.

Upon completion of the curing, whether condensation or free radical, germanosiloxane compounds can be produced such as gels, coatings, films (freestanding or on substrates), plaques, fibers and others.

In some cases, they can have one or more improved properties compared to the analogous siloxane materials, for example, improved mechanical properties, improved hardness, improved reactivity, improved solubility in polar solvents, or higher refractive index. The properties of germanosiloxanes depend primarily upon the stoichiometry of the siloxane and germanoxane units, their relative arrangement (distribution) within the polymer, the organofunctional groups on the silicon and germanium nuclei, the molecular weight of the germanosiloxane polymers, and the structure of the germanosiloxane polymers The refractive index of the germanosiloxanes is higher than that for siloxanes. The improvement in refractive index is related to the number of the organogermanium oxo units in the germanosiloxane polymer and the density of the polymer (for a polymer of a given molecular weight). In general all other things being equal, increasing product density will proportionally increase the refractive index.

The germanosiloxane polymers described above in their precured, hydrolyzate, and cured forms can be used as matrices in composite formulations and systems. These can contain fillers (discontinuous and continuous), if desired. Suitable fillers include, but are not limited to particles, such as silica or alumina or titania, or continuous fibers, such as glass fibers or carbon fibers. The improved properties of the germanosiloxane polymers compared to the siloxane analogs, coupled with the properties of the discontinuous phase (i.e., the fillers) can produce materials with improved properties such as optical and mechanical properties. Those skilled in the field will recognize that there may be processing issues involved during formulation and composite fabrication. The composite germanosiloxanes can be useful as coatings with improved hardness and optical properties, as films, monoliths, fibers (discontinuous and continuous) and plaques.

Other optional ingredients that can be used to modulate the shelf life, the cure time, and the cure temperature are those known as inhibitors, which are known to those skilled in the art. These compounds typically form complexes with the catalyst system and, based on their formation constant, can compete effectively with the main reaction of hydrosilation. Suitable compounds that can function as effective inhibitors are usually those containing phosphorous, oxygen, sulfur, or amino groups. Examples could be triethyl amine, triphenyl phosphine, dimethyl sulfoxide, butyl acetate among many others.

Hydrogen is present in the synthesized liquid polymer. There, the hydrogen content is tied to the expected molecular structure. However, once the material is cured to form a gel, film, or the like, the structure is more or less amorphous. The hydrogen content will be equal to or reduced relative to the original polymer.

One embodiment of the present invention is a germanosiloxane compound having an empirical formula: $Si_wGe_xO_yC_z$ where $w+x+y+z=1$; $0.5*y<w+x<1.5*y$; and $0.1*y<w+x<6z$.

The germanosiloxane compound can be made into various articles which contain 0-50 atom percent hydrogen, including, but not limited to, gels, coatings, films (freestanding or on substrates), plaques, and fibers.

One embodiment of a cohydrolysis reaction is shown below. Dimethylgermanium chloride is reacted with dimethylsilicon chloride to form the germanosiloxane.

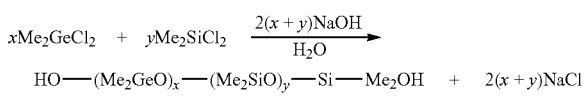

One embodiment of a ring opening polymerization reaction is shown below.

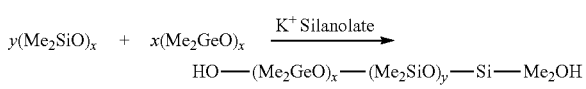

EXAMPLE 1

Co-Hydrolysis of $Me_2GeCl_2$ and $Me_2SiCl_2$

A 3 necked round bottom flask was equipped with a stir bar, condenser, thermometer, and additional funnel. Water was added to reach 18 wt % HCl concentration after hydrolysis was completed. NaOH was added to the system in molar quantities to neutralize the HCl. An amount of 6.98 g (0.175 mol) NaOH was dissolved in 29.0 g (1.61 mol) of de-ionized water, and cooled to room temperature. 5.6 g (0.043 mol) of Me$_2$SiCl$_2$ was added dropwise to the water solution. An amount of 29.0 g (0.31 mol) of toluene was added. Next, 7.5 g (0.043 mol) of Me$_2$GeCl$_2$ was added dropwise to the two phase system. The pH after the Me$_2$GeCl$_2$ addition was about 4.0, slightly more acidic than desired. The reaction mixture was stirred for 2 hr after the completion of the Me$_2$GeCl$_2$ addition. The two phases were separated using a separatory funnel. The toluene phase was dried over anhydrous sodium sulfate.

The toluene phase was spin coated on a silicon wafer. Two samples were made. The first was filtered through a 0.45 μm Whatman filter, and spin coated at 1000 rpm for 15 sec. The second was filtered through a 0.20 μm Whatman filter, and spin coated at 1000 rpm for 10 sec. A coating was observed on both wafers, although it was of poor quality. The samples showed RI values of 1.45-1.50 at about 600 nm, which is not much above standard siloxane material. This is most likely due to the low germanium content on the wafer. It might have been due to poor coating quality or the loss of germanium species during the spin coating process.

EXAMPLE 2

Co-Hydrolysis of Me$_2$GeCl$_2$ and Me$_2$SiCl$_2$

A. 25 Mole % Me$_2$GeCl$_2$/75 Mole % Me$_2$SiCl$_2$

A 250 mL round bottom flask was equipped with a thermometer, condenser, addition funnel mechanical stirrer, and heating mantle. An amount of 9.26 g of NaOH was dissolved in 9.40 g of de-ionized water and added to the reaction flask, which was placed in an ice bath to cool the solution to 10° C. Approximately 12 mL of Me$_2$SiCl$_2$ was added dropwise to the NaOH solution. The reaction was cooled, and about 5 g of Me$_2$GeCl$_2$ was added dropwise to the reaction. About 27 mL of petroleum ether was added. The reaction refluxed at 35-45° C. for 4 hours. The reaction product was filtered to remove the residual NaCl. The aqueous and organic layers were separated. The aqueous layer was washed with petroleum ether. The organic layer was dried with CaSO$_4$. The product was obtained by drying the petroleum ether layer under a N$_2$ stream. The final product was a viscous liquid.

B. 50 Mole % Me$_2$GeCl$_2$/50 Mole % Me$_2$SiCl$_2$

A 250 mL round bottom flask was equipped with a thermometer, condenser, addition funnel mechanical stirrer, and heating mantle. An amount of 9.37 g of NaOH was dissolved in 9.63 g of de-ionized water and added to the reaction flask which was placed in an ice bath to cool the solution to 10° C. Next, 7.4 mL of Me$_2$SiCl$_2$ was added dropwise to the solution, and the solution was cooled to 10° C. An amount of 3.39 g of NaOH was dissolved in 5.01 g of water, and added to the reaction. This was done to ensure that the reaction solution was basic before the addition of the Me$_2$GeCl$_2$. An amount of 10 mL of Me$_2$GeCl$_2$ was added dropwise to the reaction. The reaction was cooled to 10° C., and about 37 mL of petroleum ether was added. The reaction refluxed at 45-55° C. for 4 hours. The reaction product was filtered to remove the residual NaCl. Petroleum ether was used to rinse the flask, and then poured into the separatory funnel with the aqueous phase. The aqueous and organic layers were separated. The aqueous layer was washed with petroleum ether. The petroleum ether phase was dried with calcium sulfate overnight. The product was obtained by drying the petroleum ether layer under a N$_2$ stream. The final product was a mixture of liquid and crystal-like precipitate.

C. 75 Mole % Me$_2$GeCl$_2$/25 Mole % Me$_2$SiCl$_2$

A 250 mL round bottom flask was equipped with a thermometer, condenser, addition funnel mechanical stirrer, and heating mantle. An amount of 6.22 g of NaOH was dissolved in 6.72 g of de-ionized water. An ice bath was added to the round bottom flask. The NaOH/water solution was cooled to about 10° C., and 2.5 mL of Me$_2$SiCl$_2$ was added dropwise to the reaction. The reaction was cooled to about 10° C. An amount of 10 mL of Me$_2$GeCl$_2$ was added dropwise to the round bottom flask. The solution was cooled back to 10° C., and 20 mL of petroleum ether was added. The reaction was refluxed at about 40° C. for 4 hours. The reaction product was filtered to remove the residual NaCl. The aqueous and organic layers were separated. The aqueous layer was washed with petroleum ether. The organic layer was dried with CaSO$_4$. The product was obtained by drying the petroleum ether layer under a N$_2$ stream. The final product was mostly crystals with some liquid.

D. 50 Mole % Me$_2$GeCl$_2$/50 Mole % Me$_2$SiCl$_2$ Concurrent Hydrolysis

A 250 mL round bottom flask was equipped with a thermometer, condenser, addition funnel, mechanical stirrer, and heating mantle. An amount of 9.21 g of NaOH was dissolved in 10.77 g of de-ionized water. An ice bath was added to the round bottom flask. The NaOH/water solution was cooled to ~15° C. An amount of 10 g of Me$_2$GeCl$_2$ and 7 mL of Me$_2$SiCl$_2$ were mixed together in an addition funnel. The mixture was then added drop-wise to the reaction. Next, 37 mL of petroleum ether was added to the reaction. Once the additions were complete, the ice bath was removed, and the reaction was refluxed at about 40° C. for 4 hours. The reaction product was filtered to remove the residual NaCl. The aqueous and organic layers were separated. The organic layer was dried with MgSO$_4$. The product was obtained by drying the petroleum ether layer under a N$_2$ stream. The final product was a liquid with some crystals/precipitate.

The products were analyzed using GC-MS, IR, GPC, and NMR. These tests indicated that a mixture of siloxane, germoxane, and germanosiloxane species were present. There was little difference in the species formed at the various germanium levels. The co-hydrolysis procedure produced a high proportion of low molecular weight species, most of which were cyclic.

A summary of the polymers synthesized is shown in Table 1.

TABLE 1

| Sample Info | Description | Expected [%] Ge | Expected [%] Si | Actual [%] Ge | Actual [%] Si |
| --- | --- | --- | --- | --- | --- |
| 25% Ge/75% Si | Viscous liquid | 25 | 75 | 34 | 66 |
| 50% Ge/50% Si | Liquid | 52 | 48 | 41 | 59 |
| 50% Ge/50% Si | Liquid, with a couple of crystals | 52 | 48 | 46 | 54 |
| 50% Ge/50% Si, concurrent | Liquid, with a couple of crystals | 50 | 50 | n/a | n/a |
| 75% Ge/25% Si | Mix of liquid and crystal-like precipitate | 76 | 24 | 78 | 22 |

EXAMPLE 3

Ring Opening Polymerization (Me$_2$GeO)$_4$ was made as follows. A 100 mL round bottom flask was equipped with a thermometer, condenser, addition funnel, magnetic stirring bar, and heating mantle. An amount of 8.99 g of NaOH was dissolved in 9.14 g of de-ionized water. An ice bath was added to the round bottom flask. An amount of 20 g of $Me_2GeCl_2$ was added dropwise over 40 minutes. Next, 28 mL of petroleum ether was added. The temperature was about 10-20° C. throughout the $Me_2GeCl_2$ and petroleum ether additions. The reaction mixture refluxed for about 4 hours. Good mixing of the reaction was observed. The aqueous and organic layers were separated using a separatory funnel. The aqueous layer was washed with 30 mL of petroleum ether 4 times. Gel-like droplets were observed on the walls of the separatory funnel. The petroleum ether phase was dried over anhydrous magnesium sulfate and the product was recrystallized under a stream of $N_2$. The final product was a white crystalline material.

A. Ring Opening Polymerization of 345 Fluid [$(Me_2SiO)_{4,5,6}$]+$(Me_2GeO)_x$

A 50 mL round bottom flask was equipped with a nitrogen purge, thermometer, condenser, addition funnel, magnetic stirring bar, and heating mantle. An amount of 1.32 g of $(Me_2GeO)_4$, 9.02 g of Dow Corning® 345 Fluid, and 0.43 g of potassium trimethylsilanolate were added to the flask and stirred. Heat was applied to the reaction, and all components had dissolved into solution at 65° C. The heat was increased to about 130° C., and the reaction was stirred for 2 hours. An increase in viscosity was observed. Acetic acid was added dropwise until a pH of about 6 was obtained (as tested by Fisher Short Range Alkacid pH paper, pH 6.0-8.5). A white precipitate formed after the acetic acid addition. The sample was centrifuged and filtered to remove the precipitate.

B. Ring Opening of PDMS+$(Me_2GeO)_x$

Polydimethylsiloxane (PDMS) was produced by standard hydrolysis of $Me_2SiCl_2$. 20 g of $Me_2SiCl_2$ was added dropwise to 57.55 g of $H_2O$ and allowed to react for about 7 hours. The product was washed with water until pH neutral.

A 50 mL round bottom flask was equipped with a nitrogen purge, thermometer, condenser, addition funnel, magnetic stirring bar, and heating mantle. An amount of 3.195 g of PDMS, 0.77 g of $(Me_2GeO)_x$, and 0.0230 g of potassium trimethylsilanolate were added to the flask and stirred. The reaction mixture became very viscous, and stirring was difficult. Dow Corning® 345 fluid (1.55 g) was added to dilute the solution to improve stirring. The reaction was heated to 130° C. for 2 hours. It was difficult to obtain good stirring during the reaction due to the high viscosity of the solution. Acetic acid was added dropwise until a pH of about 6 was obtained (as tested by Fisher Short Range Alkacid pH paper, pH 6.0-8.5). A white precipitate formed after the acetic acid addition. The final product was a high viscosity fluid. The sample was not filtered.

A summary of the polymers made is shown in Table 2.

TABLE 2

| Sample Info | Description | Actual [%] Ge | Actual [%] Si |
|---|---|---|---|
| 345 fluid + $(Me_2GeO)_x$ | clear liquid product | 8 | 92 |
| PDMS + $(Me_2GeO)_x$ | clear liquid product | 9 | 91 |

Two germanosiloxane polymers were applied to 100 mm diameter Si<100> wafers by spin coating. One polymer was 34% Ge/66% Si and the other was 46% Ge/54% Si. The polymers were mixed with toluene to form 49.5 wt % and 46.9 wt % solutions, respectively. Each sample was spin coated using a Chem Mat Technology Spin Coater KW-4A at 1000 rpm for 30 sec. The solutions were filtered through a 0.2 μm Whatman filter. The samples were heated in air on a hot plate set at 300° C. for one minute.

All refractive index tests were performed on a spectroscopic ellipsometer with wavelength range 200-1000 nm, at an incident angle of 75 degrees. The ellipsometric data was mathematically fit using a Cauchy dispersion model to extract the film thickness and the refractive index vs. wavelength characteristic. The refractive index value decreased with wavelength, characteristic of dielectric material. The extinction coefficient of the film was at or below the system detection limit at wavelength values 400-1000 nm, indicating the films are transparent in visible light.

Film composition was determined by Rutherford backscattering spectrometry.

Table 3 shows the average film thickness, nominal film elemental composition, and average refractive index value as measured at 5 points on the wafer surface. The thickness of the film on the wafer varied by 20% across the wafer surface. The refractive index (RI) value reported for each film is the value at 632 nm wavelength. The refractive index value of the film varied by 6% across the wafer surface.

TABLE 3

| Sample Mole % of starting monomer | Nominal Thickness (Å) | Atomic Concentration of film | | | | Refractive Index of film (632 nm) |
|---|---|---|---|---|---|---|
| | | C | O | Si | Ge | |
| 46% Ge/54% Si | 2360 | 45.0 | 29.5 | 21.0 | 4.5 | 2.50 |
| 34% Ge/66% Si | 4880 | 47.7 | 29.0 | 22.2 | 1.4 | 2.05 |

The solubility of several germanosiloxanes in water and organic solvents was evaluated. The materials were placed in the solvent and shaken vigorously. Observations were taken after shaking and after the sample sat for one day. A one phase solution indicated the sample was soluble in the given solvent. If a liquid sample was placed in a solvent, but the quantity observed was smaller than originally added, the sample was deemed partially soluble. If a sample was added to the solvent and the solvent became cloudy with a decrease in sample size, that material was considered partially soluble. If the sample was added to the solvent and both remained unchanged, they were considered not soluble. The results are shown in Table 4.

TABLE 4

| | $H_2O$ | | Toluene | | Acetone | | Isopropanol | |
|---|---|---|---|---|---|---|---|---|
| Sample | A/S | 1 day | A/S | 1 day | A/S | 1 day | A/S | 1 day |
| 34% Ge/66% Si | — | S | S | S | S | S | N | S |
| 46% Ge/54% Si | — | — | S | S | PS | S | N | S |
| 78% Ge/22% Si | — | S | N | N | N | N | N | N |
| 8% Ge/92% Si | N | — | S | — | S | — | S | — |

A/S = observations immediately after shaking
S = soluble,
PS = partially soluble,
N = not soluble The addition of germanium species to the siloxane chain did affect the solubility of the polymer at higher germanium contents. Most interesting was the ability to adjust the water solubility of a siloxane by increasing germanium content.

While certain representative embodiments and details have been shown for purposes of illustrating the invention, it will be apparent to those skilled in the art that various changes in the compositions and methods disclosed herein may be made without departing from the scope of the invention, which is defined in the appended claims.

The invention claimed is:

1. An article made from a heteroelement siloxane polymer, wherein the article has a refractive index in a range of from about 1.7 to about 2.8, wherein the article contains 0-50 atom percent hydrogen, wherein the heteroelement siloxane polymer has an empirical formula: $Si_wM_xO_yC_z$ where M is an element selected from Groups IVA excluding Si or IVB; $w+x+y+z=1$; $0.5*y<w+x<1.5*y$; and $0.1*y<w+x<6z$; wherein the heteroelement siloxane polymer comprises:

wherein $R_1$, $R_2$, $R_3$, $R_4$, and $R_{10}$ are independently selected from $C_1$ to $C_{10}$ hydrocarbyl groups, $C_1$ to $C_{10}$ halogen-substituted hydrocarbyl groups, hydrogen, or alkenyl groups; Z is independently selected from M or Si; M is an element selected from Groups IVA excluding Si or IVB; m, n and q are positive integers; m+n+q is greater than 4; and q is the number of branched points.

2. The article of claim 1 wherein M is Ge.

3. A heteroelement siloxane polymer comprising:

wherein $R_1$, $R_2$, $R_3$, $R_4$, and $R_{10}$ are independently selected from $C_1$ to $C_{10}$ hydrocarbyl groups, $C_1$ to $C_{10}$ halogen-substituted hydrocarbyl groups, hydrogen, or alkenyl groups; Z is independently selected from M or Si; M is an element selected from Groups IVA excluding Si or IVB; m, n and q are positive integers; m+n+q is greater than 4; and q is the number of branched points.

4. The heteroelement siloxane polymer of claim 3 wherein a film, coating, or gel made from the heteroelement siloxane polymer has a refractive index of about 1.7 and 2.8.

5. The heteroelement siloxane polymer of claim 3, wherein at least one of $R_1$, $R_2$, $R_3$, or $R_4$ is a methyl group.

* * * * *